United States Patent
Vircks

[19]

[11] Patent Number: 5,965,878
[45] Date of Patent: Oct. 12, 1999

[54] PERFORMING QUADRATURE AND PUSH BUTTON FUNCTION UTILIZING TWO IR EMITTER/DETECTOR PAIRS

[75] Inventor: Bradley J. Vircks, Cedar Rapids, Iowa

[73] Assignee: Rockwell Science Center, Inc., Thousand Oaks, Calif.

[21] Appl. No.: 08/965,012

[22] Filed: Nov. 5, 1997

[51] Int. Cl.[6] ........................................ G01D 5/34
[52] U.S. Cl. ................. 250/229; 250/221; 250/214 PR; 340/555
[58] Field of Search .............................. 250/214 PR, 221, 250/229, 231.13–231.18; 340/539, 546, 555–557, 870.08; 341/13, 31

[56] References Cited

U.S. PATENT DOCUMENTS

| | | | |
|---|---|---|---|
| 3,906,222 | 9/1975 | Astier et al. .............................. | 250/229 |
| 4,634,861 | 1/1987 | Ching et al. ............................. | 250/229 |
| 4,803,362 | 2/1989 | Butts ....................................... | 250/229 |
| 4,917,360 | 4/1990 | Kojima .................................... | 254/362 |
| 4,943,715 | 7/1990 | Konishi ................................... | 250/229 |
| 5,034,602 | 7/1991 | Garcia, Jr. et al. ................. | 250/227.22 |
| 5,047,628 | 9/1991 | Schmidt et al. ........................ | 200/447 |
| 5,272,383 | 12/1993 | Umemura et al. ..................... | 307/112 |
| 5,347,123 | 9/1994 | Jackson et al. ........................ | 250/229 |

*Primary Examiner*—Stephone Allen
*Attorney, Agent, or Firm*—Kyle Eppele; James P. O'Shaughnessy

[57] ABSTRACT

A selector assembly for use in avionic multifunctional displays to perform quadrature and push button functions is described herein. The selector assembly utilizes two sensors and a cylindrical band with an encoder pattern having three distinct zones to sense either direction of rotation (quadrature) of a knob or its push motion. The pattern can include regions that are absorptive and reflective to infrared (IR) energy. The selector assembly uses the two sensors to sense a pattern rotation or a push motion of the pattern, thereby reducing the number of mechanical and sensing components and simplifying the wiring associated with the assembly. The encoder pattern is molded either directly on the inside of the knob or on a label that is adhered to the interior surface of the knob. The physical components and the sensors of the encoder mechanism are also placed within the knob of the selector assembly, thereby optimizing the useable glass surface area available for avionic displays.

20 Claims, 5 Drawing Sheets

PERFORMING QUADRATURE AND PUSH BUTTON FUNCTION UTILIZING TWO IR EMITTER/DETECTOR PAIRS

FIELD OF THE INVENTION

The present invention relates generally to a selector assembly. More particularly, the present invention relates to a selector assembly for use in compact user interfaces, such as, for use with avionic multifunctional displays to perform quadrature and push button functions.

BACKGROUND OF THE INVENTION

Conventional selector assemblies used in avionic multifunctional displays generally include a user interface or knob and an encoder mechanism for sensing the pushing or turning of the knob. The knob and encoder mechanism are attached to a housing which can be employed partially above and below a Liquid Crystal Display (LCD).

Encoder mechanisms typically employ three sensors and two separate disk mechanisms to perform quadrature and push button functions. For example, selector assemblies can utilize three Hall-effect sensors or three optical emitter/detector pairs to detect manipulation of the knob. In a particular type of optically-based encoder mechanism, two emitter/detector pairs are positioned with respect to two rotating pattern disks fixed to the knob to sense the direction of rotation (i.e., quadrature, either clockwise or counterclockwise). A third emitter/detector pair, with its own separate physical mechanism, detects a push motion of the knob. The three sensors, each with separate mechanical mechanisms, generally require a high parts count, more complicated wiring, and increased manufacturing costs.

The separate disks used in current encoder mechanisms are configured to slide past each other. Since these disks have to be engaged and driven with a fair degree of accuracy, the parts also have to be relatively precisioned with close mechanical tolerances. Thus, the components in conventional encoder mechanisms are not only expensive but are also subject to wear. Moreover, there is also the potential for the shedding of materials and the clogging of apertures within the encoder mechanism. A further expense is then incurred in the maintenance of these component parts.

Conventional encoder mechanisms are typically designed to be placed inside the housing of the selector assembly. As a result, the encoder mechanism, with at least three sensors and separate physical mechanisms, increases the space required by the housing of the selector assembly. The large selector housing can interfere with space that would otherwise be available for display component parts, such as, the LCD glass.

Thus, there is a need for a selector assembly that does not use separate disk mechanisms for encoding a motion. Further, there is a need for a selector assembly that utilizes only two sensors to perform both quadrature and push button functions. Further still, there is a need for a selector assembly that places the physical components and the sensors of the encoder mechanism in the knob, thereby optimizing the usable glass surface area for avionic displays. Even further still, there is a need for placing the encoder pattern and the sensing mechanism within the knob of the selector assembly, whereby both the number of component parts and the associated production costs are minimized.

SUMMARY OF THE INVENTION

The present invention relates to a selector assembly for providing a plurality of output signals. The selector assembly includes a housing, a pair of sensors disposed within the housing, and a knob rotatably coupled to the housing and slidably coupled to the housing. The knob has indicia. The pair of sensors produce the output signals in response to the indicia. The output signals provide information as to status of the knob being pushed or rotated.

The present invention further relates to an encoder assembly for providing a plurality of output signals. The encoder assembly includes a shaft, a plurality of sensors coupled to the shaft, and an outer knob rotatably coupled to the shaft and slidably coupled to the shaft. The knob has a cylindrical marking on an inside surface. The sensors produce the output signals in response to the marking. The output signals provide information as to status of the knob being pushed or rotated.

The present invention still further relates to a user interface assembly for providing a plurality of output signals. The output signals provide information indicative of quadrature and push selection. The user interface assembly includes a housing and a knob means for rotating with respect to the housing and for moving in a direction perpendicular with respect to the housing, whereby the knob means has a marking on an inside surface. The user interface assembly also includes a pair of sensors disposed within the housing and a knob rotatably coupled to the housing and slidably coupled to the housing, whereby the knob has a marking on the inside surface. The user interface assembly further includes a sensor means for sensing the marking and for providing the output signals in response to the marking. The sensor means includes a pair of sensors disposed to sense different portions of the marking.

According to one exemplary aspect of the present invention, a single selector device is used to perform both quadrature and push button functions. In particular, a selector assembly (also called an encoder assembly or a user interface assembly) utilizes two sensors and a cylindrical band with a pattern having three distinct zones to sense either the direction of rotation (i.e., quadrature) of a knob or its push condition. The pattern can include regions which are reflective and absorptive to infrared (IR) energy. The selector assembly advantageously uses only two sensors to sense a pattern rotation or a push motion of the pattern, thereby reducing the number of mechanical and sensing components and simplifying the wiring associated with the assembly.

According to another exemplary aspect of the present invention, the encoder pattern and the sensing mechanism are placed within the knob of the selector assembly. This configuration reduces the size of the selector assembly and provides more room for components, such as, a liquid crystal display (LCD) panel. This is particularly advantageous in the field of avionic multifunctional displays, where space on the front panel is at a premium. Placing the physical components and sensing mechanism in front of the display glass not only simplifies the mechanics but also enlarges the usable glass surface area for the display.

DESCRIPTION OF THE DRAWINGS

Exemplary embodiments of the present invention will hereinafter be described wherein like numerals denote like elements and.

DETAILED DESCRIPTION

Figure 1:
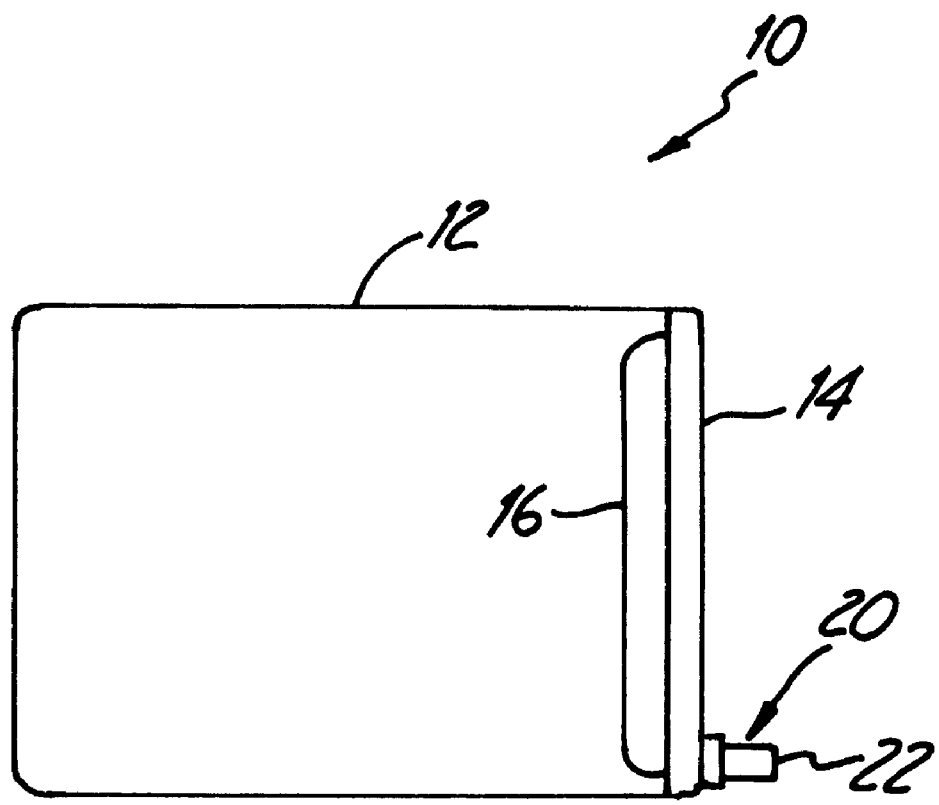
FIG. 1 is a side view of a selector assembly disposed in a front panel of a multifunctional display in accordance with an exemplary embodiment of the present invention.

With reference to FIG. 1, a side view of a multifunctional display 10 is shown. Multifunctional display 10 described herein is preferably configured for avionic display applications. Alternatively, display 10 can also be used in portable electronic applications, electronic entertainment systems, or any electronic control environment.

Multifunctional display 10 includes a housing 12, a front panel 14, and a liquid crystal display (LCD) glass 16 disposed inside housing 12 immediately behind panel 14. A selector assembly (also called an encoder assembly or a user interface assembly) 20 is coupled to the front side of panel 14. Unlike conventional assemblies (not shown), assembly 20 does not pierce glass 16, thereby optimizing the space available inside housing 12 for LCD glass 16. This configuration is particularly advantageous in the field of avionic multifunctional displays, where display space is at a premium.

Figure 2:
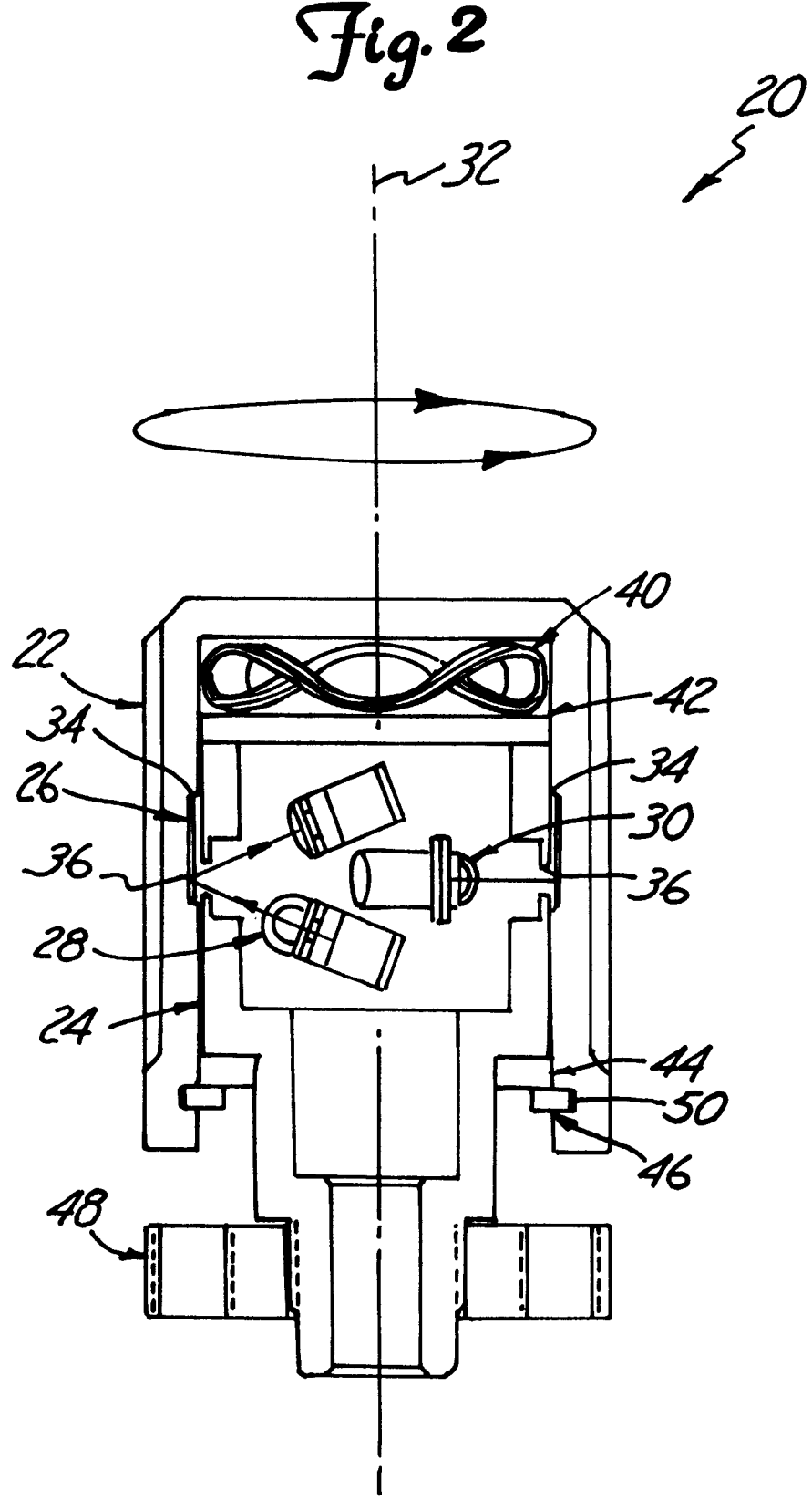
FIG. 2 is a cross-sectional view of the selector assembly illustrated in FIG. 1.

A cross-sectional view of selector assembly 20 is shown in FIG. 2. Selector assembly 20 includes an outer knob 22, a shaft or housing 24, an encoder pattern or an encoder pattern inlay 26, and a pair of sensors 28 and 30. Knob 22 is preferably cylindrically-shaped and overlays shaft 24 which is also cylindrically-shaped. In particular, knob 22 is rotatably mounted over, and slidably coupled to, shaft 24. Knob 22 is configured for rotating with respect to shaft 24 about an axis 32 and for moving with respect to shaft 24 in a direction parallel to the axis 32, e.g., knob 22 can be rotated or pushed. Knob 22 is preferably made of a molded plastic, which advantageously renders it lightweight, reliable, and economical.

Encoder pattern 26 is disposed on the interior surface of knob 22. In particular, encoder pattern 26 is integral with the interior surface of knob 22, e.g., is molded either directly on the inside of knob 22 or on a label that is adhered to the interior surface of knob 22. In the latter option, a metal label is preferably used since metal has a lower thermal coefficient of expansion. In one preferred embodiment, to protect it from mechanical wear on shaft 24, encoder pattern 26 is mounted within a groove 34 on the inside surface of knob 22. Alternatively, encoder pattern 26 can be disposed on a smooth surface on the inside of knob 22 or on a raised section of the inside of knob 22, with shaft 24 indented to accommodate the encoder pattern 26.

Shaft 24 includes a pair of windows or slits 36. The width of slits 36 is preferably matched to encoder pattern 26 disposed on the inside of knob 22 in front of slits 36. Slits 36 limit the area on pattern 26 which sensors 28 and 30 can view. Shaft 24 is preferably made of metal, such as, aluminum or carbon steel. Alternatively, shaft 24 can also be plastic.

Sensors 28 and 30 are disposed within, and fixedly coupled to, shaft 24 of selector assembly 20. A plastic or metal fixture (not shown) maintains sensors 28 and 30 aligned with respect to each other. In one preferred embodiment, to minimize the diameter of selector assembly 20, one of sensors 28 and 30 is disposed vertically, while the other sensor in the pair is disposed horizontally.

Sensors 28 and 30 are configured to sense different portions of encoder pattern 26 through slits 36 on shaft 24 and, ultimately, to provide output signals which can directly or indirectly indicate a quadrature or push motion of knob 22. Each of sensors 28 and 30 is preferably an infrared (IR) emitter/detector pair. Alternatively, Hall-effect magnetic sensors can also be used with a magnetic encoder pattern. Even further, microswitches can take the place of IR emitter/detector pairs when using a mechanical encoder pattern 26. In this configuration, a raised encoder pattern 26 with a gully and a groove can be sensed by the microswitches.

Selector assembly 20 further includes a spring 40, a first wear plate or disk 42, a second wear plate or disk 44, a retaining ring 46, and a mounting flange 48. Spring 40 is disposed between shaft 24 and knob 22 of selector assembly 20 and is biased against a push motion against knob 22. Upon release of the push moment, spring 40 recoils to obtain its original configuration. Spring 40 is preferably a helical spring. Alternatively, a wave washer can also be used.

First wear plate 42 is disposed between spring 40 and shaft 24 of selector assembly 20, whereas, second wear plate 44 is arranged between shaft 24 and retaining ring 46. Wear plates 42 and 44 provide protection against mechanical shedding of plastic or metal components, e.g., enable rotation of selector assembly 20 without wearing off knob 22 on shaft 24.

Retaining ring 46 is preferably disposed adjacent to second wear plate 44 within a groove 50 on knob 22 of selector assembly 20. Retaining ring 46 maintains selector assembly 20 together, e.g., prevents knob 22 from being pulled from selector assembly 20. Mounting flange 48 is coupled to shaft 24 of selector assembly 20. In particular, mounting flange 48 secures shaft 24 of selector assembly 20 to the front side of front panel 14 of avionic multifunctional display 10 (FIG. 1).

In one preferred embodiment, the dimensions of selector assembly 20 are configured such that knob 22 has a diameter of 0.5 inch and a length of 0.75 inch. Alternatively, other dimensions can be used for the diameter and the length of knob 22 of selector assembly 20.

Figure 3:
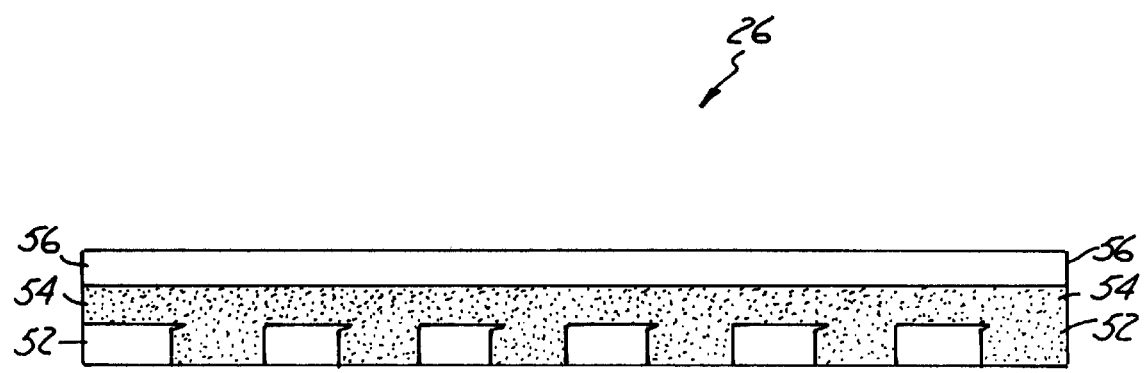
FIG. 3 is a more detailed planar view of an encoder pattern used in the selector assembly illustrated in FIG. 2, demonstrating the different light absorptive and light reflective regions.

With reference to FIG. 3, a more detailed planar view of the encoder pattern 26 used in selector assembly 20 is shown, demonstrating the different light absorptive and light reflective regions. In particular, the cylindrically-shaped encoder pattern 26 of selector assembly 20 illustrated in FIG. 2 is now shown in an unwrapped configuration. Encoder pattern 26 comprises three distinct zones or rows in different combinations of regions that are absorptive or reflective to infrared (IR) energy. In particular, encoder pattern 26 includes a first zone 52, a second zone 54, and a third zone 56.

First zone 52 is an alternating pattern of light absorptive and light reflective regions, e.g., black and white regions, respectively. Second zone 54 is a totally light absorptive region, e.g., black only; whereas third zone 56 is a totally light reflective region, e.g., white only. In the cylindrically-shaped configuration of encoder pattern 26, first zone 52 has alternating absorptive and reflective regions in a direction of rotation of knob 22 about axis 32 of selector assembly 20. Thus, first zone 52 of encoder pattern 26 is used to sense rotation and direction of rotation (i.e., quadrature, either clockwise or counterclockwise) of knob 22 of selector assembly 20.

The combination of second zone 54 and third zone 56 form alternating absorptive and reflective regions in a direction of motion of knob 22 that is parallel to axis 32 of selector assembly 20. Thus, both second zone 54 and third zone 56 of encoder pattern 26 are used to sense a push condition of knob 22 of selector assembly 20. Aside from light absorptive and light reflective regions, other forms of indicia can be used to mark encoder pattern 26, such as, a groove, an indentation, a step, or a magnetic region.

Figure 4:
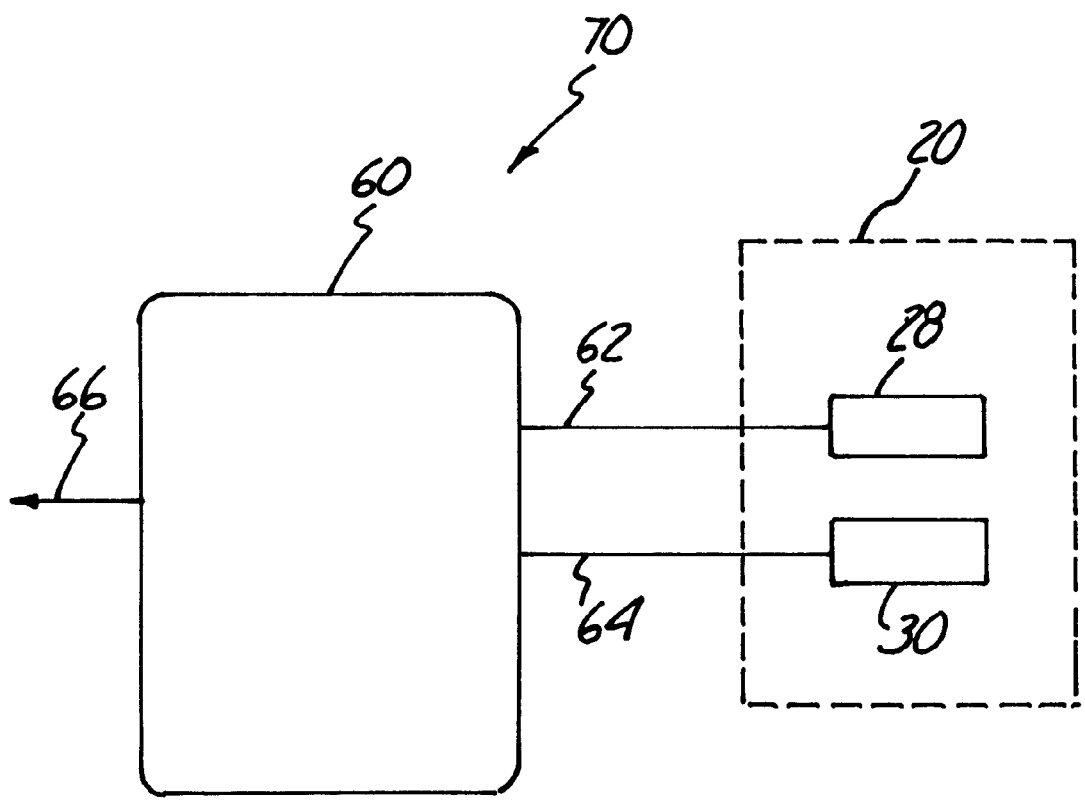
FIG. 4 is an exemplary block diagram of a quadrature and push button sensing system for use with the selector assembly illustrated in FIG. 1.

FIG. 4 shows a quadrature and push-sensing system 70, including a control circuit 60 coupled to selector assembly 20. In particular, sensors 28 and 30 within knob 22 (FIG. 2) of selector assembly 20 provide a plurality of output signals in response to sensed portions of encoder pattern 26. More specifically, sensors 28 and 30 are coupled individually by two different lines or channels 62 and 64, respectively, to control circuit 60. Moreover, channels 62 and 64 carry the respective output signals from sensors 28 and 30 of selector assembly 20.

The output signals carried on channels 62 and 64 from sensors 28 and 30, respectively, can be digital, analog, serial, parallel, or other type of signal for providing indication of a turn or a push of knob 22 of selector assembly 20. However, in one preferred embodiment, the output signals are binary signals that represent the respective portions on encoder pattern 26 viewed by sensors 28 and 30, e.g., either a light absorptive or a light reflective portion of encoder pattern 26. For example, when sensor 28 is focused on a light absorptive region, a logic 0 is provided on channel 62. Similarly, when sensor 30 is focussed on a reflective region, a logic 1 is provided on channel 64. Control circuit 60 can be a microcontroller, a state machine, or any circuit capable of implementing a state table or an algorithm for the output signals provided by sensors 28 and 30 of selector assembly 20. Control circuit 60 then generates status signal at an output 66 indicative of the current quadrature or push condition of knob 22 of selector assembly 20. The status is preferably determined by comparing a present state of the output signals provided by sensors 28 and 30 to at least one previous state of the same output signals.

Figure 5:
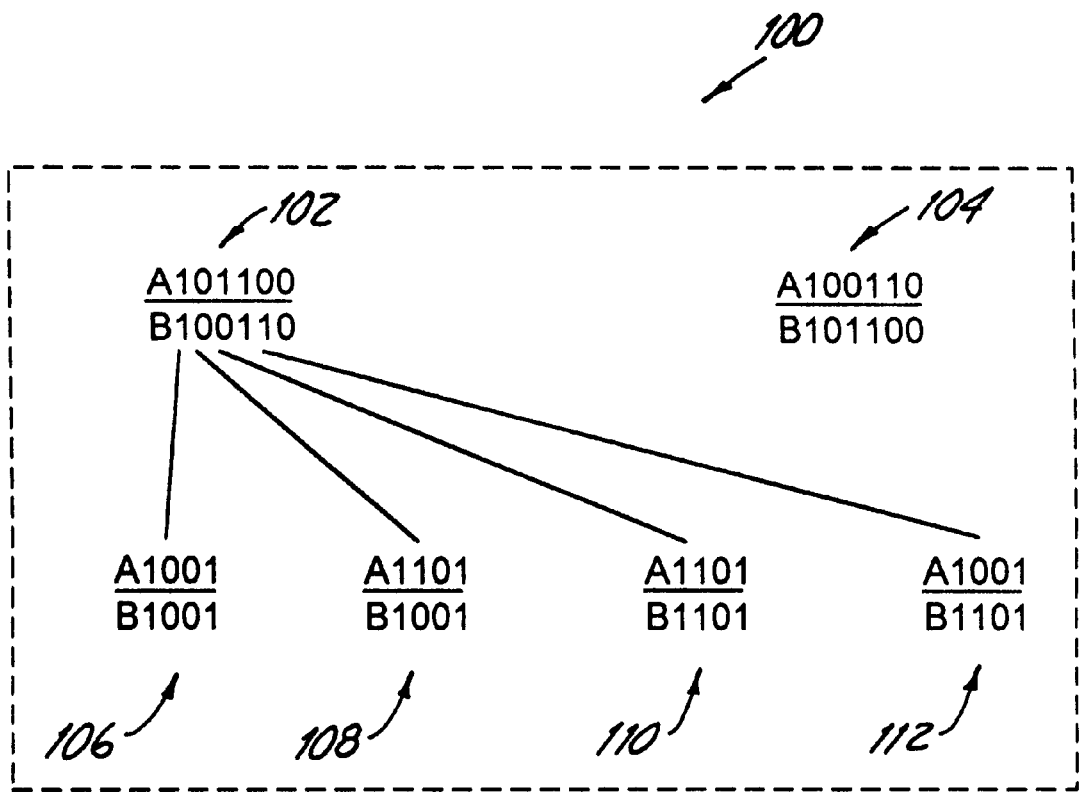
FIG. 5 is an example of a state table, demonstrating quadrature or push status of a knob included in the selector assembly illustrated in FIG. 1.

With reference to FIGS. 1–5, the operation of system 70 is discussed below as follows, wherein selector assembly 20 is manipulated both in quadrature and push button motions. In FIG. 5, a state diagram 100 includes a state diagram 102 representing signals or states on channel 62 (channel A) and channel 64 (channel B) when knob 22 is rotated clockwise. Additionally, diagram 100 includes a state table 104 indicating the output signals on channels A and B when knob 22 is rotated counterclockwise. State tables 106, 108, 110 and 112 indicate the signals or states on channels A and B when knob 22 is pushed from any individual state in tables 102 and 104.

When knob 22 is not being pushed, sensors 28 and 30 are positioned with respect to zone 52 of pattern 26 so that one of sensors 28 and 30 is closer to a transition of absorptive and reflective regions when knob 22 is rotated in a first direction than the other sensor. Sensors 28 and 30 are also positioned with respect to zone 52 of pattern 20 so that the other sensor of sensors 28 and 30 is closer to a transition of absorptive and reflective regions when knob 22 is rotated in a second direction than the one sensor. In this way, the output signals for sensors 28 and 30 do not transition simultaneously when knob 22 is rotated.

When knob 22 is in a free straight (e.g., when knob 22 is neither being pushed nor rotated), sensors 28 and 30 provide output signals on channels A and B in accordance with the sensed absorptive and reflective regions in zone 52. These output signals are stored in a buffer register, a memory, or other device (not shown). When knob 22 is rotated, one output signal on either channel A or B transitions. When a transition occurs on either channel 62 or 64, control circuit 60 reads the output signals on channels 62 and 64 and stores the output signals in the buffer. By comparing the stored previous state and the present state (e.g., the state that was just read) of channels A and B, control circuit 60 determines if knob 22 has been turned clockwise or counterclockwise and provides an appropriate status signal at output 66. For example, if a logic 1 is on channel 62 (A) and logic 0 is on channel 64 (B), and the previous state was stored as a logic 0 on both channels 62 and 64, control circuit 60 determines that knob 22 has been turned clockwise in accordance with state table 102 and provides the status signal indicating a clockwise rotation at output 66. A 0,0 state (e.g., channel A, channel B) can only be followed by a 1,0 state (see table 102). Conversely, if knob 22 is turned counterclockwise, and the previous state is stored as a 0,0 state, sensor 30 transitions from a logic 0 to a logic 1. Control circuit 60 then determines that knob 22 has been turned counterclockwise based upon the 0,0 state being followed by the 0,1 state (see table 104) and provides the status signal indicating a counterclockwise rotation at output 66.

When knob 22 of selector assembly 20 is moved in a direction parallel to axis 32 (e.g. in a push motion), control circuit 60 receives a logic 0 on both channels 62 and 64, followed by a logic 1 on both channels 62 and 64. The changes in states during a push motion from each of the stored states is shown in state tables 106, 108, 110 and 112. From stored 0,0 and 1,1 states, control circuit 60 can immediately determine that knob 22 has been pushed in accordance with state tables 106 and 110. A 0,0 state followed by a 1,1 state, or a 1,1 state followed by 0,0 state does not occur in either of state tables 102 and 104 (i.e., when knob 22 is rotated). Therefore, control circuit 60 can quickly determine that knob 22 has been pressed and can provide the states signal indicating a push at output 66.

However, the changing from either the 1,0 state and 0,1 state to the 0,0 state, can indicate a turn or a push of knob 22. (See tables 102, 104, 108 and 112.) Therefore, control circuit 60 must determine if knob 22 has been turned according to state tables 102 and 104 or pushed according to state tables 108 and 112. If knob 22 is pushed, the 0,0 state is immediately followed by the 1,1 state. Otherwise, control circuit 60 determines that knob 22 has been turned. Therefore, by determining if the 0,0 state is followed by a 1,1 state in a particular short amount of time, control circuit 60 can determine that knob 22 has been pushed in accordance with state tables 108 and 112. In contrast, if the 0,0 state is followed by the 1,0 state or the 0,1 state or another transition does not occur in the particular amount of time, control circuit 60 can determine that knob 22 has been turned in accordance with tables 102 and 104.

Alternatively, control circuit 60 can provide a rotation signal at output 66 whenever knob 22 is pushed in the 1,0 or 0,1 states. If high precision of the position of knob 22 is not needed, the incorrect rotation status signals at output 66 do not adversely affect the control of display 10. For example, where knob 22 is a display contrast knob, the importance of one counterclockwise or clockwise rotation indication is not critical. In another alternative, after control circuit 60 determines that a push has occurred from either a 1,0 state or a 0,1 state, control circuit can provide the status signal indicating an opposite rotation at output 66 to counteract the inadvertent rotation indication provided before the push was confirmed.

It is understood that, while the detailed drawings, specific examples, and particular dimensions given describe a preferred embodiment of the present invention, they are for the purpose of illustration only. The apparatus and method of the invention is not limited to the precise details and conditions disclosed. For example, although the sensing mechanism utilizes infrared (IR) emitter/detector pairs, Hall-effect magnetic sensors can also be utilized. Even further, microswitches can take the place of IR emitter/detector pairs when using a raised encoder pattern with a gully and a groove. Thus, various changes may be made to the details disclosed without departing from the scope of the spirit of the invention, which is defined by the following claims.

What is claimed is:

1. A selector assembly for providing a plurality of output signals, the selector assembly comprising:
   a housing;
   a pair of sensors disposed within the housing; and
   a knob rotatably coupled to the housing and slidably coupled to the housing, the knob having indicia, the pair of sensors producing the output signals in response to the indicia, the output signals providing information as to status of the knob being pushed or rotated.

2. The selector assembly of claim 1, wherein the status is determined by comparing a present state of the output signals to a past state of the output signals.

3. The selector assembly of claim 1, wherein the housing is cylindrical and the knob is cylindrical, the knob overlying the housing, the housing having a pair of slits, the sensors being disposed in front of the slits.

4. The selector assembly of claim 3, wherein the indicia is disposed on an interior side of the knob, and the sensors sense markings associated with the indicia through the slits.

5. The selector assembly of claim 4, wherein a spring is disposed between the housing and the knob.

6. The selector assembly of claim 1, wherein the indicia includes an alternating pattern of a first-type region and a second-type region in a first row.

7. The selector assembly of claim 6, wherein the pattern includes a second row and a third row, the second row being the first-type region, and the third row being the second-type region.

8. The selector assembly of claim 7, wherein the first-type region and the second-type region are any of the following: a groove, an indentation, a step, a light absorptive region, a light reflective region, or a magnetic region.

9. An encoder assembly for providing a plurality of output signals, the encoder assembly comprising:
   a shaft;
   a plurality of sensors coupled to the shaft;
   an outer knob rotatably coupled to the shaft and slidably coupled to the shaft, the knob having a cylindrical marking on an inside surface, the sensors producing the output signals in response to the marking, the output signals providing information as to status of the knob being pushed or rotated.

10. The encoder assembly of claim 9, wherein the marking includes an alternating pattern of a first-type region and a second-type region in a direction of rotation of the outer knob.

11. The encoder assembly of claim 9, wherein the marking includes an alternating pattern of a first-type region and a second-type region in a direction perpendicular to a plane of rotation.

12. The encoder assembly of claim 9, wherein the shaft is cylindrical and the outer knob is cylindrical, the knob overlying the shaft, the shaft having a pair of slits, the sensors being disposed in front of the slits.

13. The encoder assembly of claim 12, wherein the sensors sense the marking through the slits.

14. The encoder assembly of claim 9, wherein the first-type region and the second-type region are any of the following: a groove, an indentation, a step, a light absorptive region, a light reflective region, or a magnetic region.

15. The encoder assembly of claim 14, wherein the status is determined by comparing a present state of the output signals to a past state of the output signals.

16. A user interface assembly for providing a plurality of output signals, the output signals providing information indicative of quadrature and push selection, the user interface assembly comprising:
   a housing;
   a knob means for rotating with respect to the housing about an axis and for moving with respect to the housing in a direction parallel to the axis, the knob means having a marking on an inside surface; and
   a sensor means for sensing the marking and for providing the output signals in response to the marking, the sensor means including a pair of sensors disposed to sense different portions of the marking.

17. The user interface assembly of claim 16, wherein the marking is integral with the knob means.

18. The user interface assembly of claim 16, wherein the sensors are infrared sensors.

19. The user interface assembly of claim 18, wherein the marking includes a first row, a second row, and a third row.

20. The user interface assembly of claim 18, wherein the first row includes alternating first-type and second-type regions, the second row is the first-type region, and the third row is the second-type region.

* * * * *